(12) United States Patent
Shim et al.

(10) Patent No.: US 12,430,036 B2
(45) Date of Patent: Sep. 30, 2025

(54) POWER LOSS PROTECTION (PLP) OPERATION AND PLP MODULE FOR ELECTRONIC DEVICES

(71) Applicant: Samsung Electronics Co., Ltd., Suwon-si (KR)

(72) Inventors: Eok Soo Shim, Suwon-si (KR); Dongjin Lim, Suwon-si (KR); Jaegyu Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/367,701

(22) Filed: Sep. 13, 2023

(65) Prior Publication Data
US 2024/0289026 A1    Aug. 29, 2024

(30) Foreign Application Priority Data

Feb. 23, 2023  (KR) .................. 10-2023-0024389

(51) Int. Cl.
   *G06F 3/06*   (2006.01)
(52) U.S. Cl.
   CPC .......... *G06F 3/0614* (2013.01); *G06F 3/0659* (2013.01); *G06F 3/0673* (2013.01)
(58) Field of Classification Search
   CPC .... G06F 3/0614; G06F 3/0659; G06F 3/0673; G06F 3/06; G06F 3/0619; G06F 3/0652; G06F 3/0658; G06F 3/0679; G06F 1/30; G06F 3/0604; G06F 2212/1016; G06F 2212/1032; H02J 7/345; H02J 9/061; H02J 9/068; H02J 2207/50

USPC ......................................................... 711/154
See application file for complete search history.

(56) References Cited

U.S. PATENT DOCUMENTS

| | | | |
|---|---|---|---|
| 7,003,620 B2 | 2/2006 | Avraham et al. | |
| 10,901,898 B2 | 1/2021 | Wu et al. | |
| 11,599,275 B2 | 3/2023 | Kim et al. | |
| 2004/0103238 A1 | 5/2004 | Avraham et al. | |
| 2013/0111104 A1 | 5/2013 | Kim | |
| 2019/0251027 A1 | 8/2019 | Wu et al. | |
| 2020/0201761 A1* | 6/2020 | Kowles | G06F 12/0875 |
| 2021/0124681 A1 | 4/2021 | Wu et al. | |
| 2022/0171542 A1 | 6/2022 | Kim et al. | |
| 2023/0073518 A1* | 3/2023 | Kao | G06F 3/0679 |

FOREIGN PATENT DOCUMENTS

| | | |
|---|---|---|
| KR | 10-0950235 B1 | 3/2010 |
| KR | 10-2013-0047680 A | 5/2013 |
| KR | 10-2019-0098688 A | 8/2019 |
| KR | 10-2102248 B1 | 4/2020 |
| KR | 10-2022-0077689 A | 6/2022 |

* cited by examiner

*Primary Examiner* — Hua J Song
(74) *Attorney, Agent, or Firm* — Muir Patent Law, PLLC

(57) ABSTRACT

Embodiments provide a power loss protection (PLP) module that is connected to a first storage device to perform a PLP operation for the first storage device, including: a volatile memory that stores data according to commands of a host; a non-volatile memory that receives and stores data of the volatile memory when the first storage device becomes inaccessible; a capacitor module that supplies a voltage to the volatile memory and the non-volatile memory when the first storage device becomes inaccessible; and a controller that controls operations of the volatile memory, the non-volatile memory, and the capacitor module.

20 Claims, 19 Drawing Sheets

POWER LOSS PROTECTION (PLP) OPERATION AND PLP MODULE FOR ELECTRONIC DEVICES

CROSS-REFERENCE TO RELATED APPLICATION

This application claims priority to and the benefit of Korean Patent Application No. 10-2023-0024389 filed in the Korean Intellectual Property Office on Feb. 23, 2023, the entire contents of which are incorporated herein by reference.

BACKGROUND

(a) Field

The present disclosure relates to a method for performing a PLP operation, a PLP module, and an electronic device.

(b) Description of the Related Art

A storage device is used as a data storage medium for various electronic devices. The storage device may store data generated or modified by various electronic devices.

The storage device may be equipped with a capacitor or other constituent element to be able to provide energy for storing data in the storage device in the event of a sudden power off (SPO) situation. A storage device including such a capacitor or other energy source may prevent damage to data by performing a power loss protection (PLP) operation when an SPO situation occurs.

However, due to its complex configuration during the development process, such storage devices may lead to prolonged hardware and software development periods, increased verification costs, and higher development difficulties. These factors, in turn, result in a higher price for a product.

SUMMARY

Embodiments of the invention provide a method for performing a PLP operation for a storage device that may not include a capacitor or other constituent element to supply power to perform the PLP operation, a PLP module for performing the PLP operation for such a storage device, and an electronic device that includes such a PLP module and storage device(s).

In various embodiments, a power loss protection (PLP) module is configured to be connected to an interface that is connected a storage device that is configured without an energy storage device for supplying voltage for use in a PLP operation. The PLP module comprises a volatile memory configured to store data according to a command of a host, a non-volatile memory configured to receive and store data of the volatile memory when the storage device becomes inaccessible over a connection to the PLP module, a capacitor module configured to supply a voltage to the volatile memory and the non-volatile memory when the storage device becomes inaccessible, and a controller configured to control operations of the volatile memory, the non-volatile memory, and the capacitor module.

The volatile memory may be configured to store second data corresponding to first data of the storage device, and the controller may be configured to store the second data in the non-volatile memory when the storage device becomes inaccessible. The PLP module may be configured to be connected to the storage device through an interface containing a command distributor. The interface may be configured to transmit a read command of the host to the storage device but not to the PLP module, and a write command or an erase command of the host to both the storage device and the PLP module. The controller may be configured to transmit data of the non-volatile memory to the storage device in response to a signal from an interface connected to the PLP module, such as if or when the storage device resumes being accessible, e.g., in response to a request signal of the storage device when the storage device becomes accessible over the interface. The controller may be configured to transmit state information of the capacitor module to the storage device, and the storage device may be configured to determine a storage unit based on the state information. The controller may be configured to transmit the state information to the storage device in response to a request signal of the storage device.

In some embodiments, the capacity of the volatile memory is larger than the capacity of a buffer memory of the storage device. The capacity of the volatile memory may be twice the capacity of a buffer memory of the storage device.

The PLP module may be further configured to be connected to a second storage device. The volatile memory may be configured to store second data corresponding to first data of the first storage device and fourth data corresponding to third data of the second storage device. The controller may be configured to store the second data in the non-volatile memory when the first storage device becomes inaccessible and the fourth data in the non-volatile memory when the second storage device becomes inaccessible. The capacity of the volatile memory may be larger than a sum of the capacity of a buffer memory of the first storage device and the capacity of a buffer memory of the second storage device. The capacity of the volatile memory may be twice the sum of the capacities of the buffer memories of the first and second storage devices.

The controller may be configured to, in response to a write command including write data received from the host in a state in which the volatile memory is full of data, delete data in a storage area containing the oldest stored data in the volatile memory and to record the write data in the storage area. The controller may be configured to, when a write command is received from the host in a state in which the volatile memory is full of data, overwrite data in a storage area storing the oldest data in the volatile memory. The PLP module may be configured to transmit state information of the capacitor module in response to a request signal from the first storage device.

In embodiments, an electronic device may comprise a host configured to control an operation of the electronic device, a storage device configured to process data according to a command of the host, a PLP module configured to perform a PLP operation when an error is detected in the storage device, and an interface that connects the host, the storage device, and the PLP module. The interface transmits a read command to the storage device when the host issues a read command, and transmits a write command or an erase command to the storage device and the PLP module when the host issues a write command or an erase command. The PLP module may include a volatile memory configured to process data according to a command of the host, a non-volatile memory configured to store data of the volatile memory when an error is detected in the storage device, and a controller configured to output data stored in the non-volatile memory to the storage device when the storage device resumes normal operation after an error is detected in the storage device.

Embodiments of a method for performing a PLP operation for a storage device can include receiving a write command or an erase command from a host, controlling a volatile memory according to the write command or the erase command, storing data of the volatile memory in a non-volatile memory by using a voltage output by a capacitor module when a sudden power off (SPO) situation occurs, and outputting data of the non-volatile memory to the storage device when the SPO situation is resolved.

DETAILED DESCRIPTION OF THE EMBODIMENTS

Figure 1:
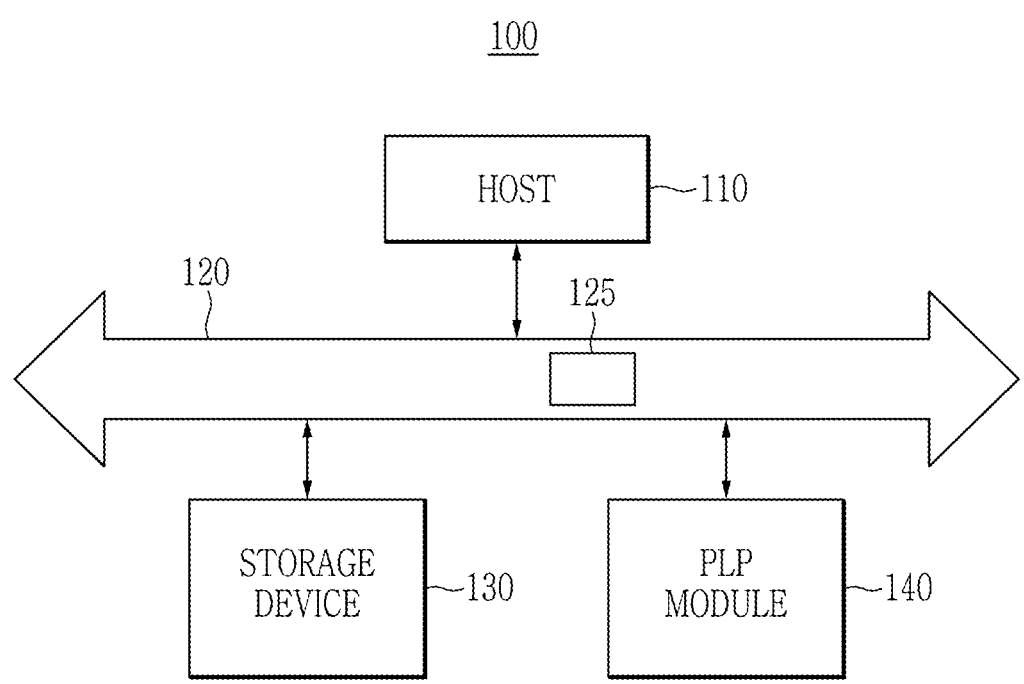
FIG. 1 illustrates a schematic block diagram of an electronic device according to an embodiment.

The present disclosure will be described more fully hereinafter with reference to the accompanying drawings, in which embodiments of the invention are shown. As those skilled in the art will realize, the described embodiments may be modified in various different ways, all without departing from the spirit or scope of the present disclosure.

Accordingly, the drawings and description are to be regarded as illustrative in nature and not restrictive. Like reference numerals designate like elements throughout the specification. In the diagrams and flowcharts described with reference to the drawings in this specification, the operation order may be changed, various operations may be merged, certain operations may be divided, and certain operations may not be performed.

In addition, a singular form may be intended to include a plural form as well, unless otherwise indicated, for example when an explicit expression such as "single" is used. Terms including ordinal numbers such as first, second, and the like will be used only to describe various constituent elements, and are not to be interpreted as limiting these constituent elements. These terms may be used for a purpose of distinguishing one constituent element from other constituent elements, and do not necessarily convey an order unless the context so indicates.

Figure 2:
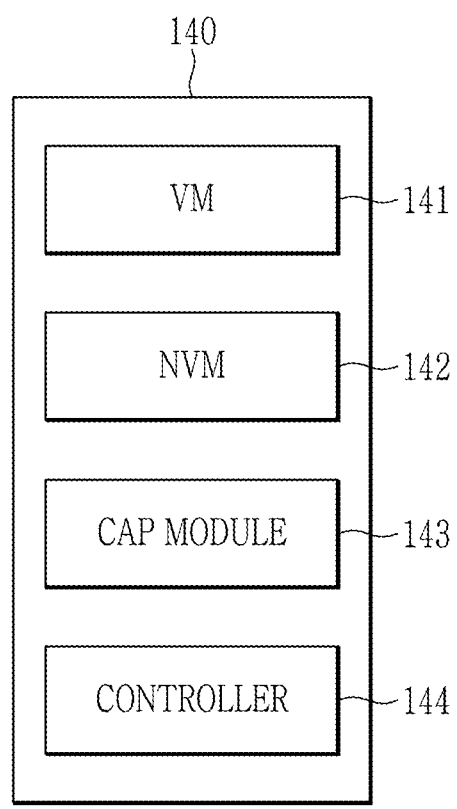
FIG. 2 illustrates a block diagram of a PLP module according to an embodiment.

FIG. 1 illustrates a schematic block diagram of an electronic device 100 according to an embodiment, and FIG. 2 illustrates a block diagram of a PLP module 140 according to an embodiment.

Referring to FIG. 1, an electronic device 100 according to an embodiment includes a host 110, an interface 120, a storage device 130, and a power loss protection (PLP) module 140. In some embodiments, the electronic device 100 may be included in user devices such as a personal computer (PC), a laptop computer, a server, a media player, and a digital camera, or in automotive devices such as a navigation device, a black box device, and an electric vehicle device. Alternatively, the electronic device 100 may be a mobile system such as a mobile phone, a smart phone, a tablet personal computer, a wearable device, a healthcare device, or an Internet of Things (IoT) device.

The host 110 may control overall operations of the electronic device 100. In some embodiments, the host 110 may be one of various processors such as a central processing unit (CPU), a graphics processing unit (GPU), a neural processing unit (NPU), a tensor processing unit (TPU), and a data processing unit (DPU). In some embodiments, the host 110 may include a single core processor or a multi-core processor.

The host 110 may generate a signal for the storage device 130. The signal may include a command and an address. In some embodiments, the command may include commands such as write commands or read commands. In some embodiments, the command may include an activate command and a read/write command.

The activate command may be a command for switching a target row of a memory in the storage device 130 to an active state in order to write data to or read data from the storage device 130. The read/write command may be a command for performing a read or write operation on a target memory cell of a row switched to an active state.

In some embodiments, the electronic device 100 may further include a memory connected to the host 110, and the memory may be used as a main memory or a system memory of the electronic device 100. The host 110 may further output commands such as an activate command, a read/write command, a precharge command, and a refresh command for the memory. In some embodiments, the memory may be a dynamic random access memory (DRAM) device, and may have a form factor of a dual in-line memory module (DIMM). However, the present disclosure is not limited thereto, and the memory may include a non-volatile memory such as a flash memory, a PRAM, an RRAM, an MRAM, and the like.

The host 110, the storage device 130, and the PLP module 140 may be configured to share the same interface 120. For example, the host 110 and the storage device 130 may communicate with each other through the interface 120. The physical implementation of an interface 120, storage device 130, and PLP module 140 can vary. For example, the storage device 130 and PLP module 140 may each be formed on a separate semiconductor chip (e.g., integrated circuit formed on a die) or separate semiconductor chip package. Some embodiments may use stacked chips, e.g., using a stacked-chip package, or package-on-package configuration to connect a storage device 130 to a PLP module 140 via an interface 120. In some embodiments, storage device 130 and PLP module 140 are disposed on a circuit board and connected via an interface switch 120. In embodiments, the interface 120 may include a low-latency and high-bandwidth link that may support coherency, memory access, and dynamic protocol muxing of an input/output protocol (I/O protocol) to enable various connections between accelerators, memory devices, or various electronic devices or components. For example, the interface 120 may be implemented as an I/O switch (for example, a Compute Express Link (CXL) switch using a CXL protocol). In addition, the host 110, the storage device 130, and the PLP module 140 may communicate with each other based on various computing interfaces such as GEN-Z protocol, NVLink protocol, CCIX protocol, Open CAPI protocol, and the like.

The interface 120 may include a command distributor 125 that may be implemented in various ways within the interface, such as with software, hardware, or firmware. The command distributor 125 may distribute commands of the host 110 using various techniques, such as by the use of a queue, a thread pool, or direct distribution. For example, the host 110 may transmit a command to the storage device 130, and the command distributor 125 may distribute the command of the host 110 to the storage device 130 and the PLP module 140.

When the command of the host 110 is a command related to user data, the command distributor 125 may distribute the command. The command related to the user data may include a read command, a write command or an erase command. For example, when the command of the host 110 is a read command, the command distributor 125 may transmit the read command to the storage device 130. In this case, the command distributor 125 does not transmit the read command to the PLP module 140. When the command of the host 110 is a write or erase command, the command distributor 125 may transmit the write or erase command to the storage device 130 and the PLP module 140.

The interface 120, the storage device 130, and the PLP module 140 may further include a device selector, which may be implemented with various techniques, such as with multiplexers, switches, shared communication channels, software, etc. The device selector may set a position where one constituent element (for example, the host 110) of the electronic device 100 wants to access another constituent element (for example, the storage device 130) thereof. For example, the device selector may determine the position of the storage device 130 or the position of the PLP module 140 to be accessed by the host 110. The device selector may transmit a command to the storage device 130 or the PLP module 140 based on the determined position. As another example, the device selector may determine the position of the storage device 130 where the PLP module 140 intends to store data. The device selector may transmit data of the PLP module 140 to the storage device 130 based on the determined position. That is, communication between the storage device 130 and the PLP module 140 may be possible by using the device selector.

The storage device 130 may include a controller and a memory. The controller of the storage device 130 may include, for example, an intellectual property (IP) circuit designed to implement an application specific integrated circuit (ASIC) and/or a field-programmable gate array (FPGA). In various embodiments, the controller of the storage device 130 may be implemented to support the CXL protocol (for example, CXL 2.0 protocol, CXL 3.0 protocol, or any other version).

The memory of the storage device 130 may include a volatile memory and a non-volatile memory. For example, the memory of the storage device 130 may include one or a combination of a dynamic random access memory (DRAM), a not- and (NAND) flash memory, a high bandwidth memory (HBM), a hybrid memory cube (HMC), a dual in-line memory module (DIMM), an Optane DIMM, a non-volatile memory DIMM (NVMDIMM), a double data rate synchronous DRAM (DDR SDRAM), and a low-power double data rate synchronous dynamic random access memory (LPDDR SDRAM).

The storage device 130 may be a device that cannot perform a PLP operation by itself in a sudden power off (SPO) situation. The PLP operation may refer to an operation for normally completing a write operation or an erase operation when an SPO situation occurs during the write operation or the erase operation. For example, the storage device 130 may not include an energy storage device such as a capacitor module or auxiliary power supply. Thus, the storage device 130 may be powered off immediately when an SPO situation occurs. The PLP module 140 may perform a PLP operation when an SPO situation occurs, and may transmit recovery data when the storage device 130 is subsequently powered on. For example, the PLP module 140 may perform a PLP operation by processing a command that the storage device 130 has not normally completed. The PLP module 140 may transmit recovery data stored through a PLP operation to the storage device 130 by using the interface 120.

In the case of the conventional storage device that performs a PLP operation on its own, when an SPO situation occurs, internal operations that must be performed, from saving data to turning off the power by using the internal power supply, may be complicated and may take a long time. For example, the conventional storage device may need to perform an interrupt operation, an abort operation for interrupting a current operation, and an operation of updating header information and meta information to organize and report a current task. On the other hand, when an SPO situation occurs in the electronic device 100 according to the present embodiment, the storage device 130 is immediately powered off without such an operation, and the PLP module 140 may perform the PLP operation. Afterwards, when the storage device 130 resumes normal operation, the PLP module 140 may transmit recovery data to the storage device 130. Accordingly, reliability may be improved by using the PLP module 140 to preserve integrity of data while reducing development difficulty by simplifying the operation of the storage device 130.

Referring to FIG. 2, the PLP module 140 may include a volatile memory (VM) 141, a non-volatile memory (NVM) 142, a capacitor (CAP) module 143, and a controller 144.

The volatile memory 141 may store data received from the host 110. For example, when the host 110 transmits a write command or an erase command, the interface 120 may transmit the write command or the erase command and data corresponding thereto to the PLP module 140. The PLP module 140 may store or erase data in the volatile memory 141 according to a command of the host 110. When an SPO situation occurs, the volatile memory 141 may transmit stored data to the non-volatile memory 142 in response to control of the controller 144.

The non-volatile memory 142 may store data transmitted by the volatile memory 141. In the volatile memory 141, data is deleted when the power is turned off, while in the non-volatile memory 142, data may be stored even when the power is turned off. Accordingly, the PLP module 140 may perform a PLP operation using data stored in the non-volatile memory 142 after the storage device 130 is powered on.

The capacitor module 143 may store or accumulate electric charges using a capacitor. The capacitor module 143 may drive the PLP module 240 by using accumulated charges when an SPO situation occurs. That is, the volatile memory 141 and the non-volatile memory 142 may operate based on the charge of the capacitor module 143. For example, the volatile memory 141 may transmit data to the non-volatile memory 142 based on a voltage output by the capacitor module 143. The non-volatile memory 142 may store data of the volatile memory 141 based on a voltage output by the capacitor module 143.

Although the PLP module 140 has been described as using charge stored in a capacitor of the capacitor module 143 for supplying power to the PLP module, the capacitor module 143 may also be implemented using other constituent elements capable of supplying power to the PLP module 140 when an SPO situation occurs, such as an auxiliary power supply, e.g., a battery.

The controller 144 may control operations of the volatile memory 141, the non-volatile memory 142, and the capacitor module 143. For example, the controller 144 may cause or effect storage of data of the volatile memory 141 in the non-volatile memory 143 when the storage device 130 becomes inaccessible. The controller 144 may drive the volatile memory 141 and the non-volatile memory 142 by operating the capacitor module 143 when an SPO situation occurs.

The controller 144 may transmit data of the non-volatile memory 143 to the storage device 130 when the storage device 130 becomes accessible. For example, the storage device 130 may be powered on and transmit a request signal to the controller 144. The controller 144 may transmit data of the non-volatile memory 143 to the storage device 130 in response to the request signal.

In some embodiments, when the storage device 130 is powered on, the storage device 130 may transmit a request signal for state information of the capacitor module 143 to the controller 144. The controller 144 may transmit state information of the capacitor module 143 in response to the request signal from the storage device 130. The storage device 130 may determine a storage unit (e.g., measured in bits, bytes, or pages) based on the state information of the capacitor module 143. For example, when the state information of the capacitor module 143 is good, the storage device 130 may determine a relatively large storage unit or a relatively long storage frequency (time interval). When the state information of the capacitor module 143 is poor, the storage device 130 may determine a relatively small storage unit or a relatively short storage frequency.

The controller 144 may receive a write command from the host 110 in a state in which the storage area of the volatile memory 141 is full of data. In one embodiment, the controller 144 may delete data in a storage area storing the oldest data in the volatile memory 141 and write data. In one embodiment, the controller 144 may overwrite data in a storage area storing the oldest data in the volatile memory 141.

FIG. 3 to FIG. 15 are drawings for explaining an operation of an electronic device 200 according to an embodiment. In the drawings, FIG. 6 to FIG. 9 and FIG. 12 are drawings for explaining operations of a storage device 230 and a PLP module 240 according to an embodiment, and FIG. 15 is a drawing for explaining an operation of a storage device 230 according to an embodiment.

In FIG. 3 to FIG. 15, an electronic device 200 according to an embodiment may include a host 210, an interface 220, a storage device 230, and a PLP module 240. The electronic device 200, the host 210, the interface 220, the storage device 230, and the PLP module 240 of FIG. 3 to FIG. 15 may be substantially the same as the electronic device 100, the host 110, the interface 120, the storage device 130, and the PLP module 140 of FIG. 1.

Figure 3:
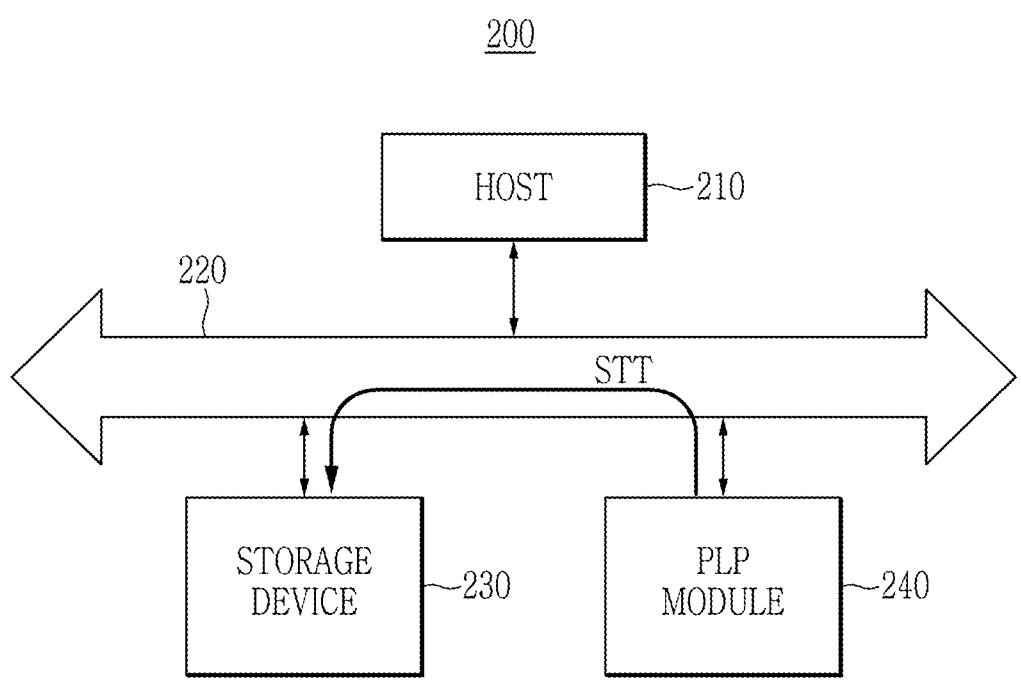
FIG. 3 is a drawing for explaining an operation of an electronic device according to an embodiment.

Referring to FIG. 3, the electronic device 200 according to the embodiment may be powered on. The powered-on PLP module 240 may transmit state information STT to the storage device 230. For example, the powered-on storage device 230 may request the state information STT from the PLP module 240. The storage device 230 and the PLP module 240 may communicate with each other through the interface 220. The state information STT may include information about a state of a capacitor module (or an auxiliary power supply) included in the PLP module 240. For example, the state information STT may include CAP health, capacitance, state of charge, and the like of the capacitor module. The CAP health may be associated with a time required for the PLP module 240 to perform a remaining operation in the SPO situation. For example, when the remaining time of the PLP module 240 is longer than the time required in the SPO situation, it indicates that the CAP health is relatively good. The capacitance may be related to the charge capacity that the capacitor module may accumulate.

The storage device 230 may operate based on the state information STT. The storage device 230 may determine an operating level of the PLP module 240 based on the state information STT. For example, the storage device 230 may determine the operating level of the PLP module 240 by comparing the state information STT with one or more threshold values. According to an embodiment, a plurality of threshold values exist that may define the operating level, and the storage device 230 may determine the operating level of the PLP module 240 according to the threshold values. In an embodiment, the operating level of the PLP module 240 may be related to a state of charge of the capacitor module. For example, when the state of charge of the capacitor module is good, as defined, for example, by exceeding a predetermined threshold, the storage device 230 may determine that the PLP module 240 is at a relatively high operating level. When the state of charge of the capacitor module is not good because it is below that threshold, the storage device 230 may determine that the PLP module 240 is at a relatively low level.

The storage device 230 may store data in a first storage unit when the PLP module 240 is at a relatively low operating level. The storage device 230 may store data in a second storage unit when the PLP module 240 is at a relatively high operating level. Here, the first storage unit may be smaller than the second storage unit. That is, the storage device 230 may frequently store data in a small size unit when the PLP module 240 is at a relatively low operating level. That is, the storage device 230 may occasionally store data in a large size unit when the PLP module 240 is at a relatively high operating level.

Figure 4:
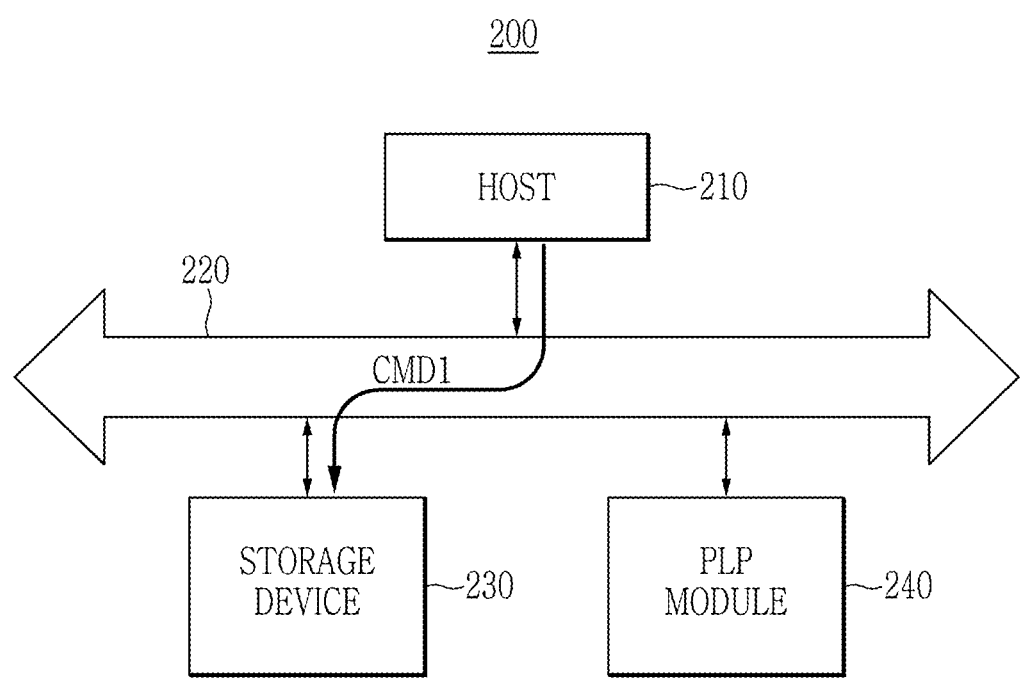
FIG. 4 is a drawing for explaining an operation of an electronic device according to an embodiment.

Referring to FIG. 4, the electronic device 200 may resume normal operation after power is turned on. For example, the host 210 may transmit a command CMD1 to the storage device 230, by which the host 210 may access the storage device 230 by using the interface 220. The command CMD1 may include a command other than a write command or an erase command. For example, the command CMD1 may include a read command, a log data acquisition command, and the like.

The storage device 230 may operate in response to the command CMD1 of the host 210. For example, the storage device 230 may transmit data requested by the host 210 to the host 210. The storage device 230 may communicate with the host 210 by using the interface 220. In some embodiments, the storage device 230 may access the PLP module 240 according to the command CMD1 of the host 210. For example, after receiving the command CMD1 from host 210, the storage device 230 may output a signal to the PLP module 240 by using the interface 220.

Figure 5:
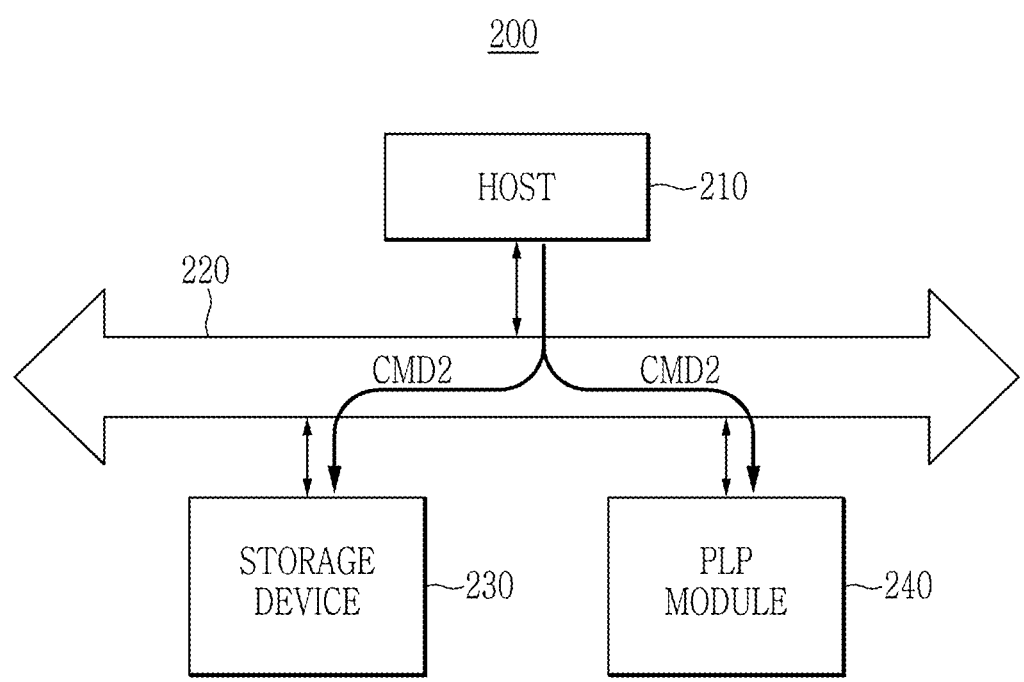
FIG. 5 is a drawing for explaining an operation of an electronic device according to an embodiment.

Referring to FIG. 5, the electronic device 200 may perform a normal operation different from CMD1 after power is turned on. For example, the host 210 may transmit a command CMD2 to the storage device 230. As with the embodiment of FIG. 4, the host 210 may access the storage device 230 by using the interface 220. The command CMD2 may be a command related to user data. For example, the command CMD2 may include a write command, an erase command, a format command, and the like. In one embodiment, the write command may include a partial write command.

The interface 220 may determine whether the command CMD2 of the host 210 is a command related to user data. When the command CMD2 is a command related to the user data, the interface 220 may transmit the command CMD2 to the PLP module 240. That is, the interface 220 may output the command CMD2 to the storage device 230 and the PLP module 240.

The storage device 230 may operate in response to the command CMD2 of the host 210. For example, the storage device 230 may record data requested by the host 210. The storage device 230 may include a volatile memory and a non-volatile memory. The storage device 230 may record data of the host 210 in the volatile memory and/or the non-volatile memory. In addition, the storage device 230 may delete data when requested by the host 210. The storage device 230 may process the command CMD2 and report it to the host 210. The storage device 230 may communicate with the host 210 by using the interface 220.

The PLP module 240 may operate in response to the command CMD2 of the host 210. For example, the PLP module 240 may record data requested by the host 210. The PLP module 240 may include a volatile memory and a non-volatile memory. The PLP module 240 may write data of the host 210 to the volatile memory and/or the non-volatile memory.

The memory capacity of the storage device 230 and the memory capacity of the PLP module 240 may be the same or different. When the capacity of the volatile memory of the storage device 230 and the capacity of the volatile memory of the PLP module 240 are different, the capacity of the volatile memory of the PLP module 240 may be larger than the buffer memory of the volatile memory of the storage device 230. The buffer memory represents a storage unit when the storage device 230 stores data from a volatile memory to a non-volatile memory, which will be described later with reference to FIG. 6 to FIG. 9.

In addition, the PLP module 240 may delete data when requested to do so by the host 210. The PLP module 240 may process the command CMD2 and report its processing status to the host 210. The PLP module 240 may communicate with the host 210 by using the interface 220.

FIG. 6 to FIG. 9 are drawings for explaining operations of the storage device 230 and the PLP module 240 when the host 210 outputs a command CMD3.

Figure 6:
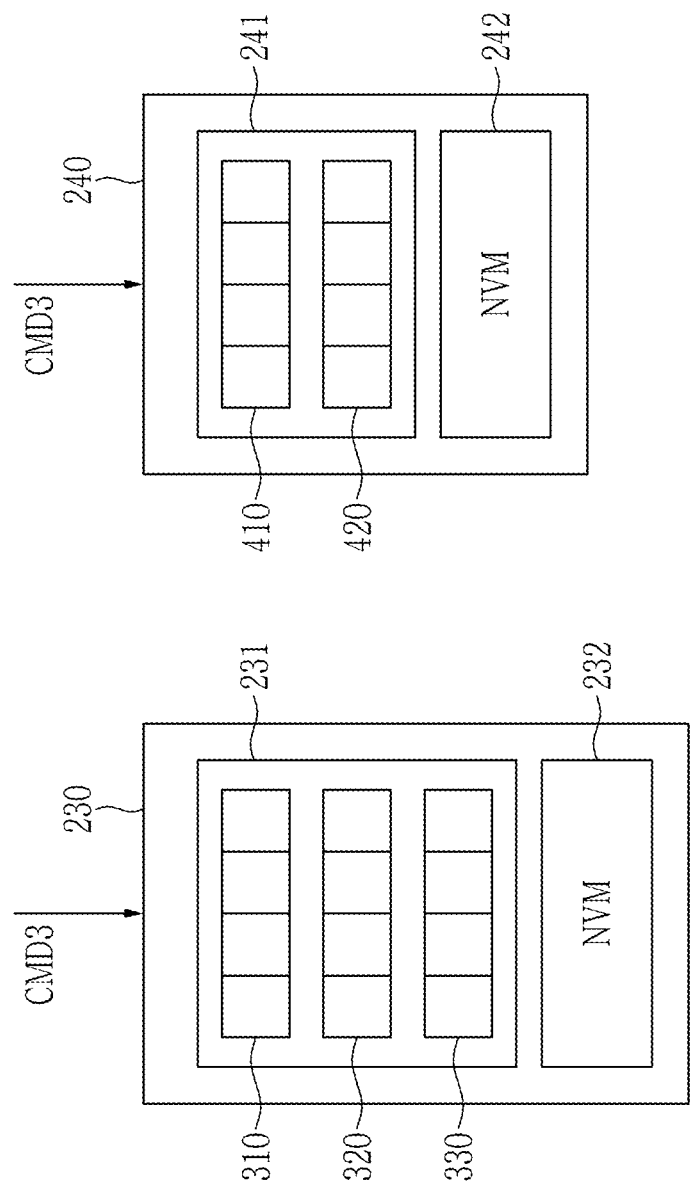
FIG. 6 is a drawing for explaining operations of a storage device and a PLP module according to an embodiment.

Referring to FIG. 6, the storage device 230 may include a volatile memory 231 and a non-volatile memory 232. The storage device 230 may store data in the volatile memory 231 before storing the data in the non-volatile memory 232. That is, the volatile memory 231 may operate as a buffer of the storage device 230. The PLP module 240 may include a volatile memory 241 and a non-volatile memory 242. The capacity of the volatile memory 231 and the capacity of the volatile memory 241 may be different. For example, the volatile memory 231 may include storage areas 310, 320, and 330, and the volatile memory 241 may include storage areas 410 and 420.

Each of the storage areas 310, 320, and 330 may be a buffer memory of the volatile memory 231. For example, the storage area 310 may be a first buffer memory of the volatile memory 231, the storage area 320 may be a second buffer memory thereof, and the storage area 330 may be a third buffer memory thereof. When a buffer memory is filled with data, the storage device 230 may store the data of the buffer memory in the non-volatile memory 232. For example, the volatile memory 231 may store data in the order of the storage area 310, then the storage area 320, and then the storage area 330. That is, when the storage area 310 is full of data, the volatile memory 231 may store data in the storage area 320. In addition, when the storage area 310 is full of data, the volatile memory 231 may transmit data of the storage area 310 to the non-volatile memory 232. Similarly, the volatile memory 231 may transmit data of the storage area 320 and the storage area 330 to the non-volatile memory 232.

In addition, each of the storage areas 410 and 420 may be a buffer memory of the volatile memory 241. For example, the storage area 410 may be a first buffer memory of the volatile memory 241, and the storage area 420 may be a second buffer memory thereof. The volatile memory 241 may store data in the order of the storage area 410 and then the storage area 420. When the storage area 410 is full of data, the volatile memory 241 may store data in the storage area 420. When the storage area 420 is full of data, the volatile memory 241 may store data in the storage area 410 storing the oldest data. The volatile memory 241 may delete existing data before storing new data in the storage area 410. The volatile memory 241 may transmit data of the storage areas 410 and 420 to the non-volatile memory 242 when an SPO situation occurs.

Although the capacities of the volatile memory 231 and the capacities of the volatile memory 241 are illustrated in FIG. 6 as being different, they are not necessarily limited thereto, and may be the same.

The storage device 230 and the PLP module 240 may receive the command CMD3 from the host 210. The command CMD3 may be a write command. The storage device 230 and the PLP module 240 may operate according to the command CMD3.

Figure 7:
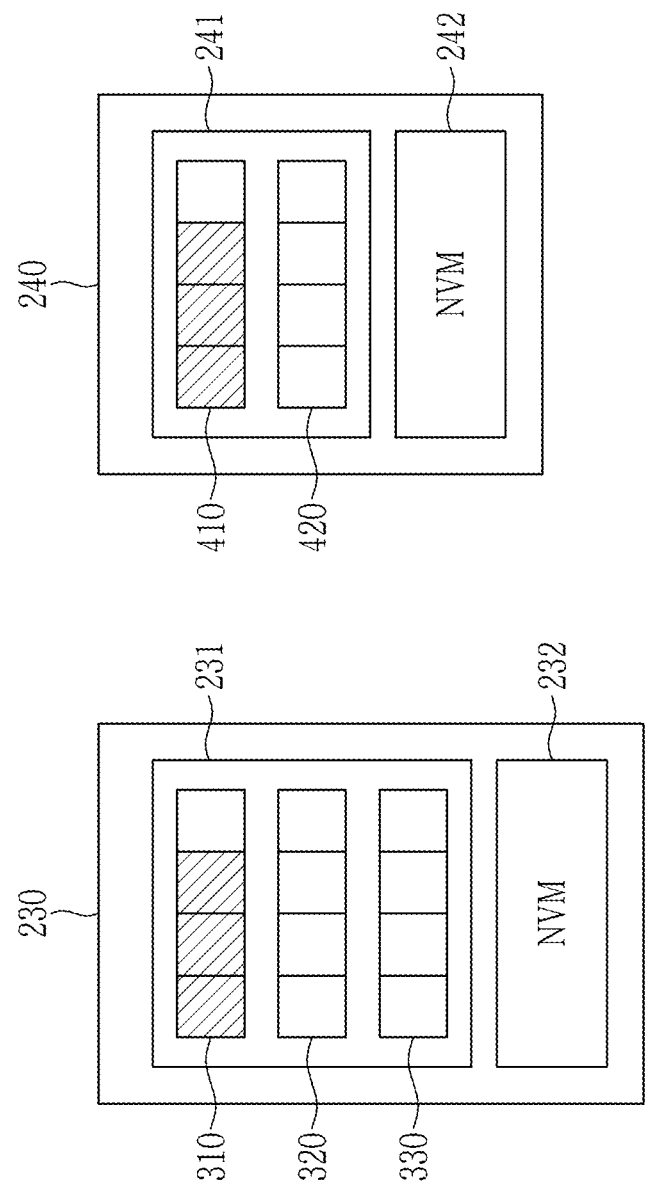
FIG. 7 is a drawing for explaining operations of a storage device and a PLP module according to an embodiment.

Referring to FIG. 7, the storage device 230 may store data in the storage area 310 of the volatile memory 231. The PLP module 240 may store data in the storage area 410 of the volatile memory 241. When the storage device 230 and the PLP module 240 receive the same command CMD3 and data from the interface 220, data stored in the storage area 310 and the storage area 410 may be the same.

Figure 8:
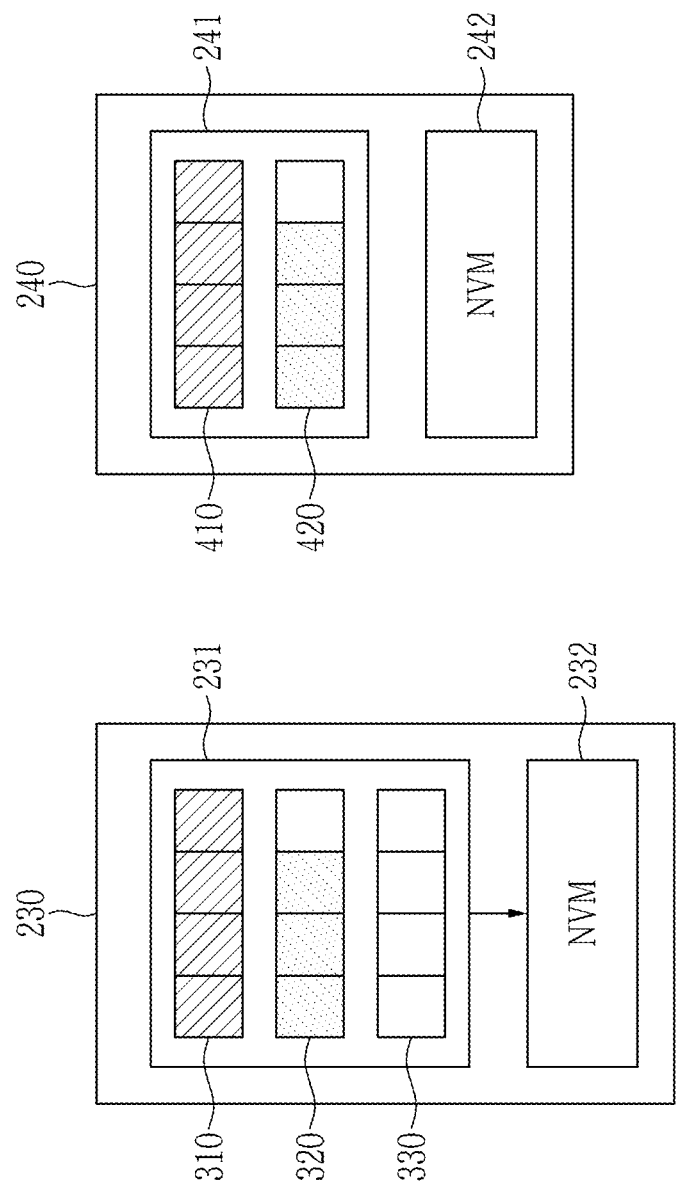
FIG. 8 is a drawing for explaining operations of a storage device and a PLP module according to an embodiment.

Referring to FIG. 8, when the storage area 310 is full of data, the storage device 230 may store data in the storage area 320. The storage device 230 may transfer data of the storage area 310 to the non-volatile memory 232. The non-volatile memory 232 may store data received from the volatile memory 231. When the storage area 410 is full of data, the PLP module 240 may store data in the storage area 420. Data stored in the storage area 320 and the storage area 420 may be the same.

Figure 9:
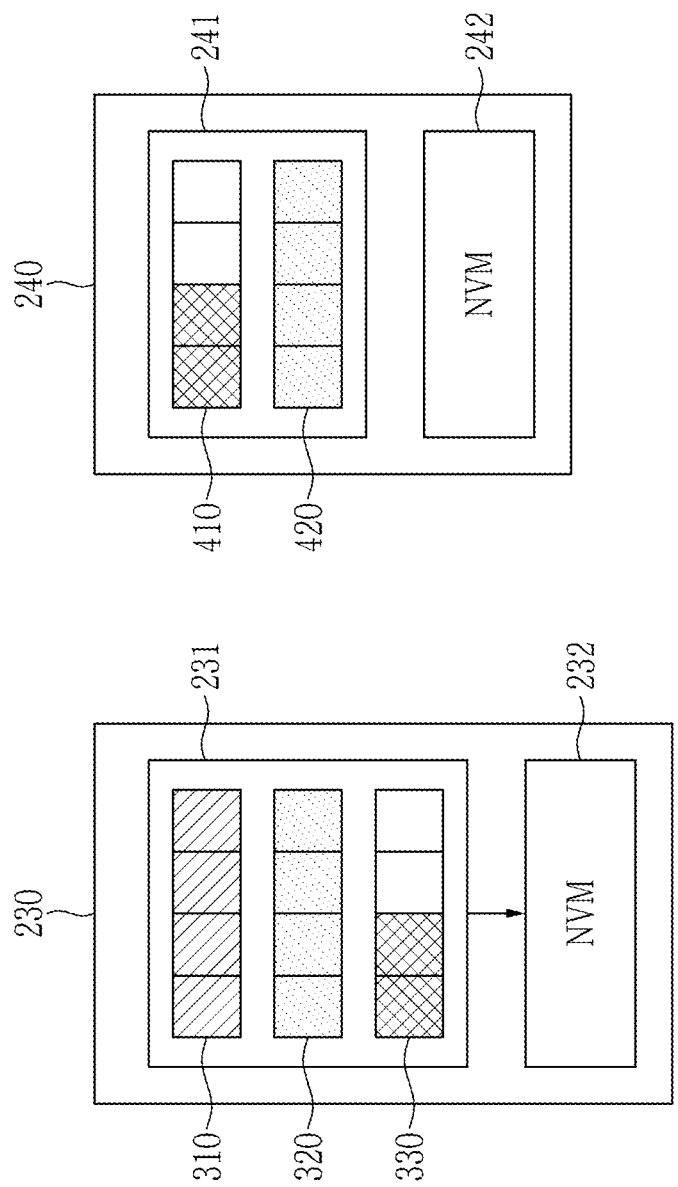
FIG. 9 is a drawing for explaining operations of a storage device and a PLP module according to an embodiment.

Referring to FIG. 9, when the storage area 320 is full of data, the storage device 230 may store additional or new data in the storage area 330. The storage device 230 may transfer data of the storage area 320 to the non-volatile memory 232. The non-volatile memory 232 may store data received from the volatile memory 231. When the storage area 420 is full of data, the PLP module 240 may store additional or new data in the storage area 410. The PLP module 240 may delete existing data before storing new data in the storage area 410. Data stored in the storage area 330 and the storage area 410 may be the same.

The PLP module 240 may store existing data of the storage areas 410 and 420 in the non-volatile memory 242 when an SPO situation occurs and new data needs to be stored. The PLP module 240 may store new data in the storage area 410 and then store the new data in the non-volatile memory 242.

In some embodiments, the PLP module 240 may overwrite existing data when new data is stored in the storage area 410.

In FIG. 5 to FIG. 9, a configuration in which the command CMD3 of the host 210 is a write command has been described, but the embodiment is not necessarily limited thereto, and the same description may be applied even when the command of the host 210 is an erase command.

For example, the storage device 230 may erase data in the volatile memory 231 in response to an erase command from the host 210. The PLP module 240 may erase data in the volatile memory 241 in response to an erase command from the host 210. During the erase operation, the storage device 230 may be powered off due to an SPO situation. The PLP module 240 may use the capacitor module to complete the erase operation, and may store data of the volatile memory 241 in the non-volatile memory 242. Afterwards, the storage device 230 may be powered on, and may transmit a request signal to the PLP module 240. The PLP module 240 may transfer data of the non-volatile memory 242 to the storage device 230, and the storage device 230 may complete the erase operation based on the data of the non-volatile memory 242. For example, the storage device 230 may restore, excluding erased data, based on data of the non-volatile memory 242.

Figure 10:
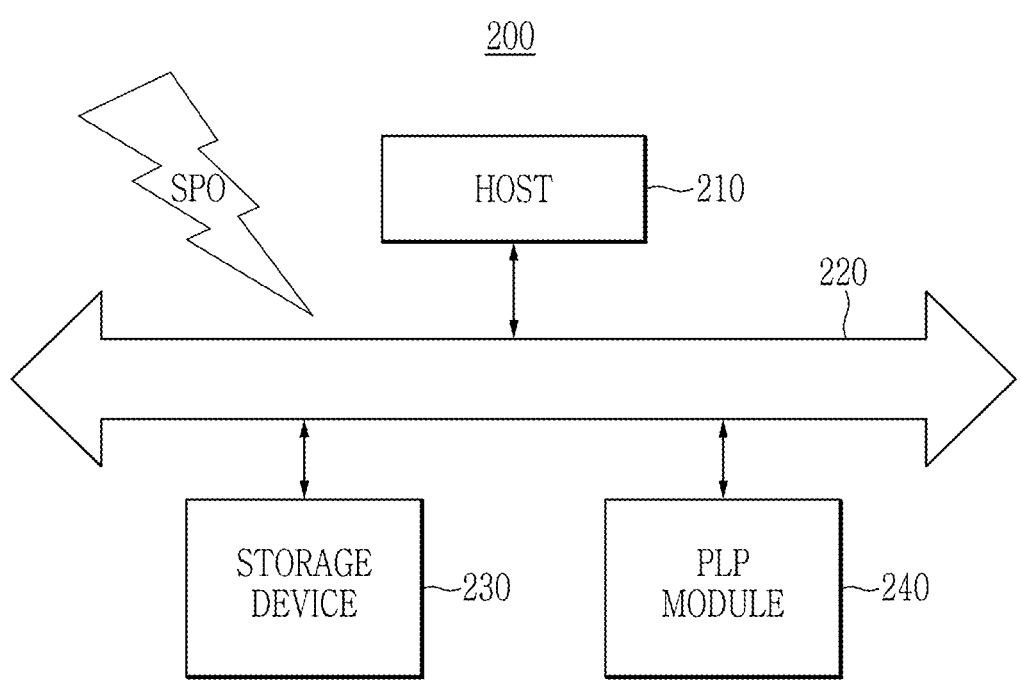
FIG. 10 is a drawing for explaining an operation of an electronic device according to an embodiment.

Referring to FIG. 10, an SPO situation may occur in the electronic device 200 according to one embodiment. The storage device 230 may be powered off when the SPO situation occurs. That is, the host 210 or the PLP device 240 may not access the storage device 230. In this case, the PLP device 240 may perform a PLP operation as described above and below by using a capacitor module. The PLP device 240 may then transmit data to the storage device 230 when the storage device 230 is powered back on.

Figure 11:
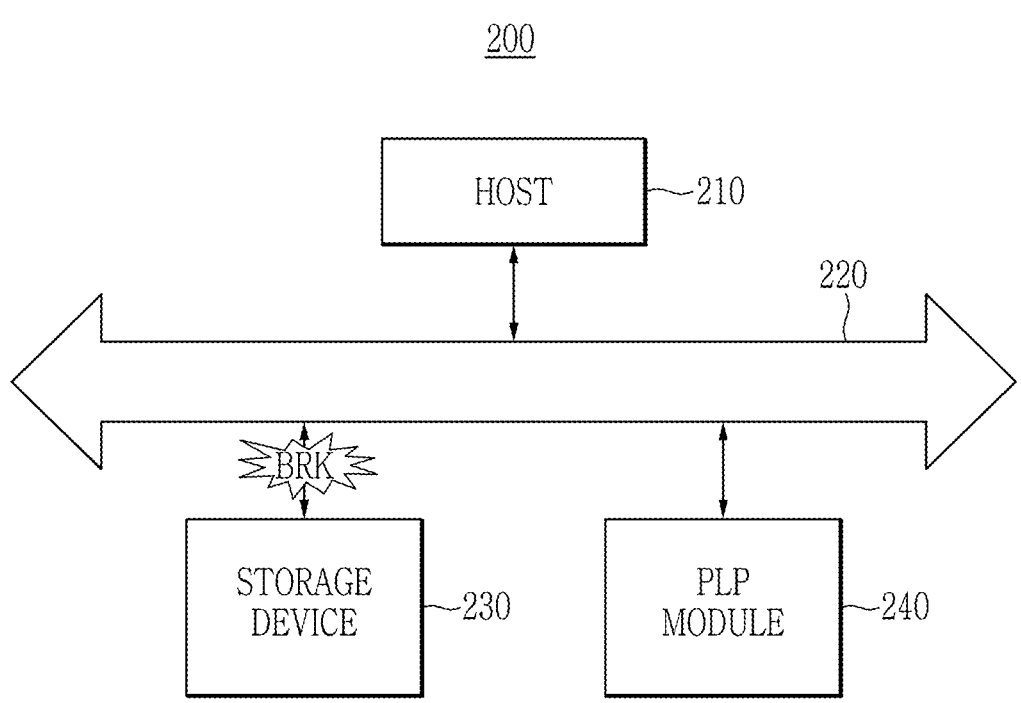
FIG. 11 is a drawing for explaining an operation of an electronic device according to an embodiment.

Referring to FIG. 11, a break situation BRK may occur in the electronic device 200 according to the embodiment. The storage device 230 may be disconnected from the interface 220 when the break situation BRK occurs. That is, the host 210 or the PLP device 240 may not access the storage device 230. In this case, the PLP device 240 may perform a PLP operation as described above and blow by using a capacitor module. The PLP device 240 may then transmit data to the storage device 230 when the break situation BRK is alleviated and the storage device 230 is powered on.

Figure 12:
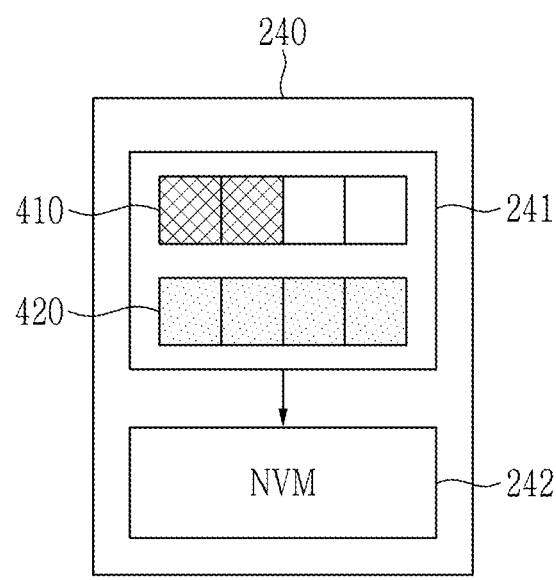
FIG. 12 is a drawing for explaining an operation of a PLP module according to an embodiment.

Referring to FIG. 12, when the SPO situation occurs as shown in FIG. 10 or the situation BRK occurs as shown in FIG. 11, the PLP module 240 may perform the PLP operation by using the capacitor module. For example, the PLP module 240 may store data stored in the storage areas 410 and 420 of the volatile memory 241 in the non-volatile memory 242. That is, the capacitor module of the PLP module 240 may have a sufficiently accumulated charge to supply a sufficient voltage for storing data of the volatile memory 241 in the non-volatile memory 242. The PLP module 240 may store all data of the volatile memory 241 in the non-volatile memory 242, and then may be powered off.

Figure 13:
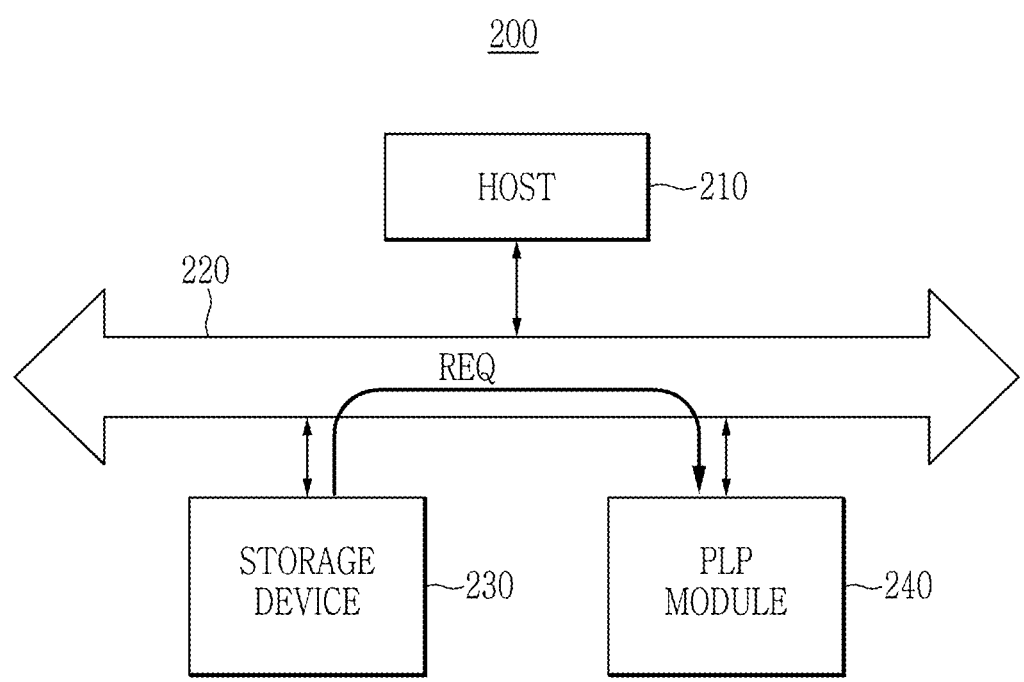
FIG. 13 is a drawing for explaining an operation of an electronic device according to an embodiment.

Referring to FIG. 13, the electronic device 200 may resume normal operation after an SPO or break situation as follows. For example, the storage device 230 in which the SPO situation occurs may be powered on to access the interface 220. As another example, the storage device 230 in which the break situation occurs may access the interface 220 again. When the power is turned on, the storage device 230 may check whether an SPO situation has occurred. When accessing the interface 220, the storage device 230 may check whether a break situation has occurred. For example, the storage device 230 may check metadata to check whether an SPO situation or a break situation has occurred.

The storage device 230 may check that the SPO situation or the break situation has occurred, and may transmit a request signal REQ to the PLP module 240. The storage device 230 may access the PLP module 240 through the interface 220. The request signal REQ may include a request for data that has not been processed by the storage device 230 as a result of the SPO situation or the break situation.

Figure 14:
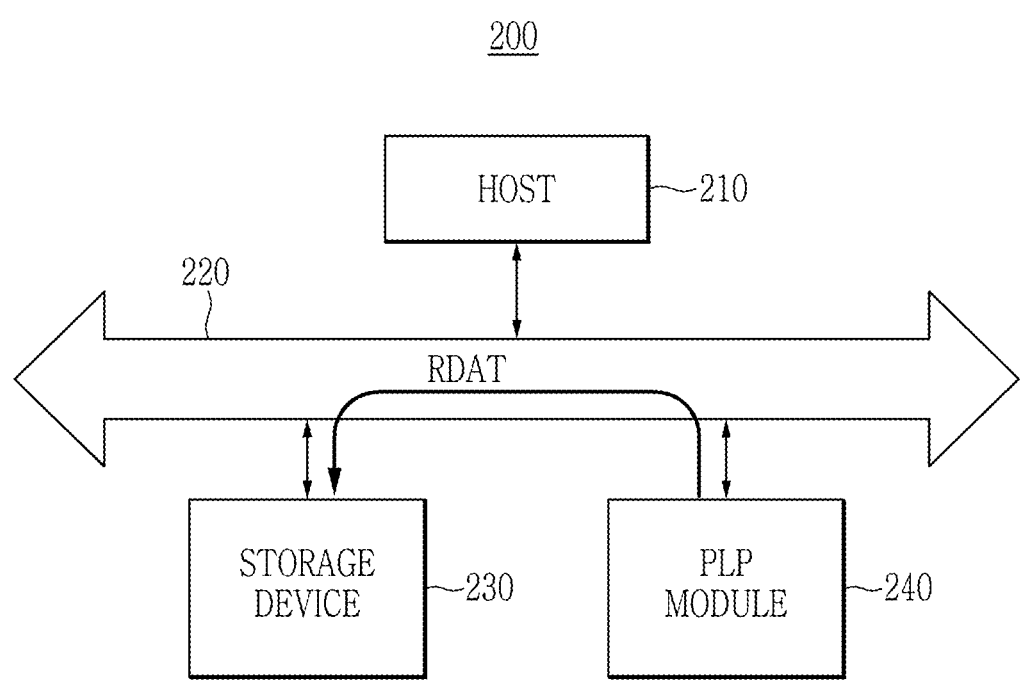
FIG. 14 is a drawing for explaining an operation of an electronic device according to an embodiment.
Figure 15:
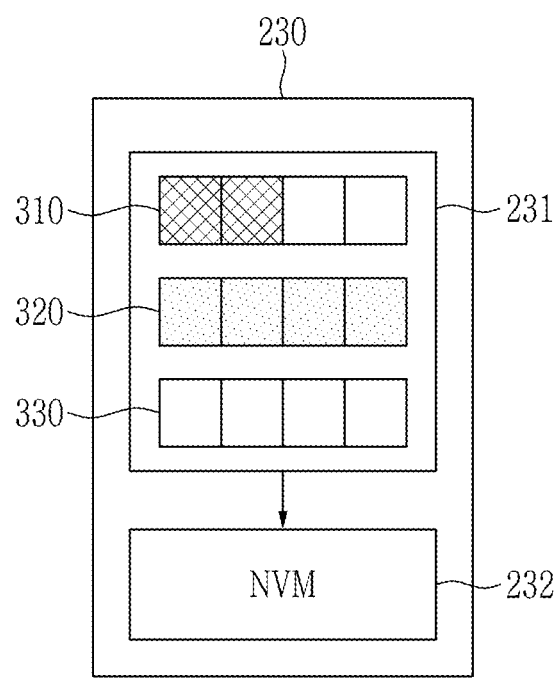
FIG. 15 is a drawing for explaining an operation of a storage device according to an embodiment.

Referring to FIG. 14, the PLP module 240 may transmit restored data RDAT to the storage device 230 in response to the request signal REQ. The PLP module 240 may store the recovery data RDAT in a non-volatile memory. The recovery data RDAT may refer to data for which the storage device 230 has not completed processing in the SPO situation or the break situation. The PLP module 240 may access the storage device 230 through the interface 220.

The storage device 230 may store the recovery data RDAT. For example, the storage device 230 may store the recovery data RDAT in a volatile memory or in a non-volatile memory.

According to one embodiment, when there is no recovery data RDAT stored in the non-volatile memory, the PLP module 240 may notify the storage device 230 that there is no recovery data RDAT. The storage device 230 may confirm that there is no recovery data RDAT and perform a normal operation.

Referring to FIG. 15, the storage device 230 may receive the recovery data RDAT. The storage device 230 may store the recovery data RDAT in the volatile memory 231. For example, the storage device 230 may store the recovery data RDAT in the storage areas 310 and 320. The storage device 230 may then store the recovery data RDAT from the volatile memory 231 to the non-volatile memory 232.

In this way, even if the storage device 230 incompletely processes the command CMD3 of the host 210 and is powered off due to the SPO or break situation, the PLP module 240 may perform the PLP operation and then may transmit the recovery data RDAT when the storage device 230 is powered on. Accordingly, the storage device 230 may complete processing of the command CMD3 by using the recovery data RDAT. That is, since the storage device 230 may respond to an SPO situation or a break situation while maintaining data integrity via communication with PLP module 240, even if there is no separate capacitor module or an auxiliary power supply included in the storage device 230, the power consumption of the storage device 230 may be reduced. In addition, since the storage device 230 does not have a separate capacitor module or an auxiliary power supply, hardware, software, and/or firmware functions may be simplified, thereby reducing design difficulty and manufacturing cost.

Figure 16:
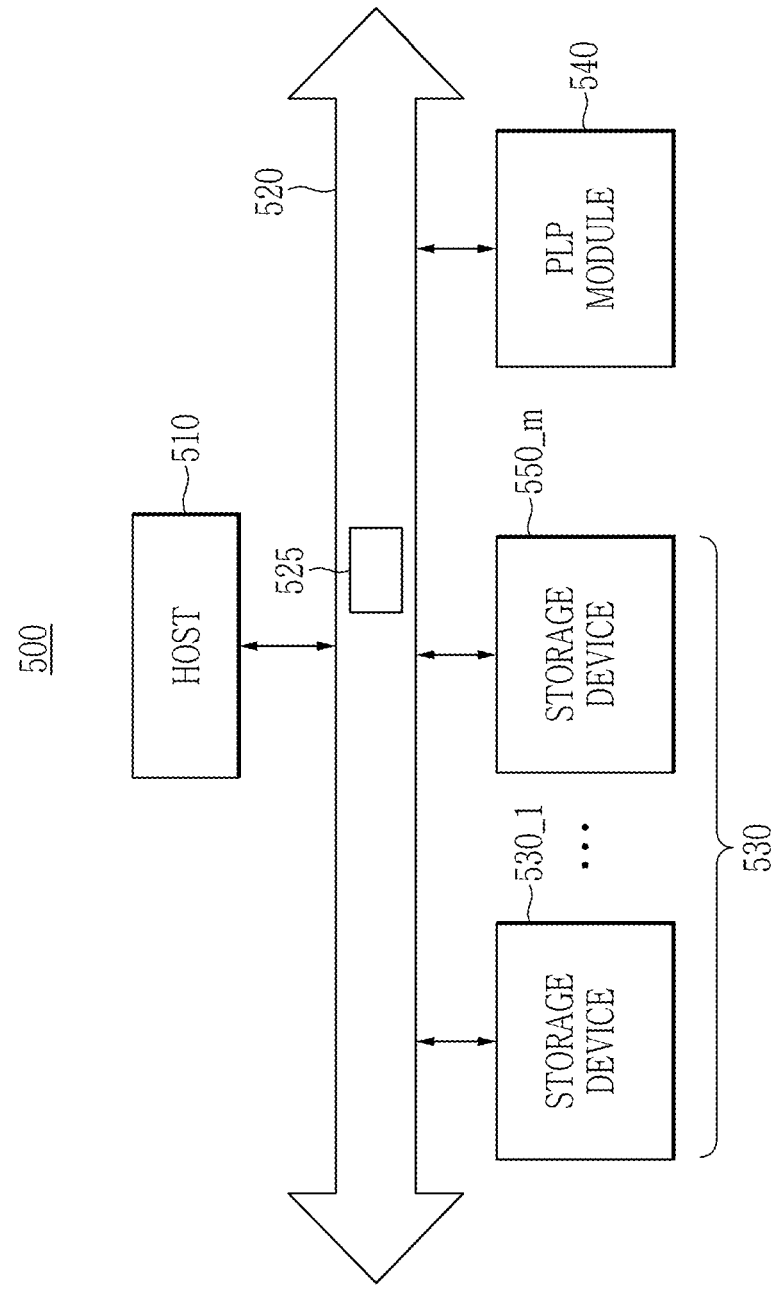
FIG. 16 illustrates a schematic block diagram of an electronic device according to an embodiment.

FIG. 16 illustrates a schematic block diagram of an electronic device 500 according to an embodiment.

Referring to FIG. 16, an electronic device 500 according to an embodiment may include a host 510, an interface 520, a plurality of storage devices 530, and a PLP module 540. In some embodiments, the electronic device 500 may be included in user devices such as a personal computer (PC), a laptop computer, a server, a media player, and a digital camera, or in automotive devices such as a navigation device, a black box device, and a vehicle electric device. Alternatively, the electronic device 500 may be a mobile system such as a portable communication terminal, a smart phone, a tablet PC, a wearable device, a healthcare device, or an Internet of Things (IoT) device.

The host 510 may control overall operations of the electronic device 500. In various embodiments, the host 510 may be one of various processors such as a CPU, a GPU, an NPU, a TPU, and a DPU. In various embodiment, the host 510 may include a single core processor or a multi-core processor.

The host 510 may generate signals for the plurality of storage devices 530. The plurality of storage devices 530 may include first to m-th storage devices. Here, m may be an integer larger than 1. The signal may include a command and an address. In some embodiments, the commands may include commands such as write commands or read commands. In some embodiments, the command may include an activate command and a read/write command.

The activate command may be a command for switching a target row of a memory in the plurality of storage devices 530 to an active state to write data to the plurality of storage devices 530 or read data from the plurality of storage devices 530. The read/write command may be a command for performing a read or write operation on a target memory cell of a row switched to an active state.

The plurality of storage devices 530 may be devices that cannot perform a PLP operation by themselves in an SPO situation. For example, the plurality of storage devices 530 may not include an energy storage device such as a capacitor module or auxiliary power supply. Accordingly, the plurality of storage devices 530 may be powered off immediately when an SPO situation occurs. The SPO situations may individually occur. For example, at least one of the plurality of storage devices 530 may be powered off due to an SPO situation. Among the plurality of storage devices 530, a device in which an SPO situation does not occur may normally operate.

When an SPO situation occurs, the PLP module 540 may perform a PLP operation on storage devices (for example, a first storage device 530_1 and a second storage device 530_2) in which the SPO situation occurs. For example, the PLP module 540 may perform the PLP operation by processing commands that the first storage device 530_1 and the second storage device 530_2 have not completed. The PLP module 540 may perform a PLP operation on the first storage device 530_1 and the second storage device 530_2 by using the interface 520.

The PLP module 540 may distinguish and store data of the first storage device 530_1 and data of the second storage device 530_2. For example, the PLP module 540 may store an identifier, an address, and data of the first storage device 530_1 together, and an identifier, an address, and data of the second storage device 530_2 together. Accordingly, the PLP module 540 may check the destination of the data.

Thereafter, when the first storage device 530_1 and the second storage device 530_2 are powered on, the PLP module 540 may transmit the stored recovery data to the first storage device 530_1 and the second storage device 530_2 through the PLP operation. The PLP module 540 may transmit data to the first storage device 530_1 and the second storage device 530_2 based on the identifier and address, which may be stored together with the data.

In some embodiments, the electronic device 500 may further include another storage device (not shown) that performs a PLP operation by itself in an SPO situation. In this case, the PLP module 540 may not perform a PLP operation on the storage device. That is, the PLP module 540 may perform the PLP operation only on the plurality of storage devices 530.

In some embodiments, the electronic device 500 may further include a memory connected to the host 510, and the memory may be used as a main memory or a system memory of the electronic device 500. The host 510 may further output commands such as an activate command, a read/write command, a precharge command, and a refresh command for the memory. In some embodiments, the memory may be a DRAM device and may have a form factor of a DIMM. However, the present disclosure is not limited thereto, and the memory may include a non-volatile memory such as a flash memory, a PRAM, an RRAM, an MRAM, and the like.

The host 510, the plurality of storage devices 530, and the PLP module 540 may be configured to share the same interface 520 with each other. For example, the host 510 and the plurality of storage devices 530 may communicate with each other through the interface 520. The interface 520 may refer to a low-latency and high-bandwidth link that supports coherence, memory access, and dynamic protocol multiplexing of input/output protocols to enable various connections between accelerators, memory devices, or various electronic devices. For example, the interface 520 may be implemented as an I/O switch (for example, a CXL switch) using a Compute Express Link (CXL) protocol. In addition, the host 510, the plurality of storage devices 530, and the PLP module 540 may communicate with each other based on various computing interfaces such as GEN-Z protocol, NVLink protocol, CCIX protocol, Open CAPI protocol, and the like.

The interface 520 may include a command distributor 525. The command distributor 525 may distribute commands of the host 510. For example, the host 510 may transmit a command to the plurality of storage devices 530, and the command distributor 525 may distribute the command of the host 510 to the plurality of storage devices 530 and the PLP module 540.

When the command of the host 510 is a command related to user data, the command distributor 525 may distribute the command to one or more of the storage devices 530 and the PLP module 540. The command related to the user data may include a write command or an erase command. For example, when the command of the host 510 is a read command, the command distributor 525 may transmit the read command to one of the plurality of storage devices 530. In this case, the command distributor 525 may not transmit the read command to the PLP module 540. When the command of the host 510 is a write command, the command distributor 525 may transmit the write command to one or more of the plurality of storage devices 530 and to the PLP module 540.

The interface 520, the plurality of storage devices 530, and the PLP module 540 may further include a device selector. The device selector may set a position where one constituent element (for example, the host 510) of the electronic device 500 wants to access another constituent element (for example, the first storage device 530_1) thereof. For example, the device selector may determine the position of the storage device or the position of the PLP module 540 to be accessed by the host 510. The device selector may transmit a command to the storage device or the PLP module 540 based on the determined position. As another example, the device selector may determine the position of the storage device where the PLP module 540 intends to store data. The device selector may transmit data of the PLP module 540 to the storage device based on the determined position. That is, communication between the plurality of storage devices 530 and the PLP module 540 may be selectively performed by using the device selector.

The plurality of storage devices 530 may include a controller and a memory. The controller of the plurality of storage devices 530 may include an IP circuit designed for ASIC and/or FPGA implementation. In various embodiments, the controller of the plurality of storage devices 530 may be implemented to support the CXL protocol (for example, CXL 2.0 protocol, CXL 3.0 protocol, or any other version).

The memories of the plurality of storage devices 530 may include a volatile memory and a non-volatile memory. For example, the memories of the plurality of storage devices 530 may include one or a combination of a DRAM, a NAND flash memory, an HBM, an HMC, a DIMM, an Optane DIMM, an NVMDIMM, and a DDR SDRAM.

The capacity of the volatile memory of the PLP module 540 may be related to the capacities of volatile memories of the plurality of storage devices 530. For example, the capacity of the volatile memory of the PLP module 540 may be greater than a sum of the capacities of respective buffer memories of the volatile memories of the plurality of storage devices 530. In an embodiment, the capacities of the buffer memories of the volatile memories of the plurality of storage devices 530 may be the same. In another embodiment, the capacities of the buffer memories of the volatile memories of the plurality of storage devices 530 may be different.

In an embodiment, a relationship between the capacity of the volatile memory of the PLP module 540 and the capacities of the volatile memories of the plurality of storage devices 530 may be as shown in Equation 1.

$$\text{VMC\_P} \geq \sum_{n=1}^{m} \text{BUC\_n} * 2 \quad \text{(Equation 1)}$$

Here, VMC_P represents the capacity of the volatile memory of the PLP module 540, and BUC_n may represent the capacity of the buffer memory of the volatile memory of the n-th storage device (n is an integer from 1 to m). That is, the capacity of the volatile memory of the PLP module 540 may be greater than or equal to twice the sum of the capacities of the buffer memories of the volatile memories of the storage devices 530.

In an embodiment, a relationship between the capacity of the volatile memory of the PLP module 540 and the capacities of the volatile memories of the plurality of storage devices 530 may be as shown in Equation 2.

$$\text{VMC\_P} \geq \sum_{r=1}^{m} \text{BUC\_r} * i_r \quad \text{(Equation 2)}$$

Here, VMC_P represents the capacity of the volatile memory of the PLP module 540, BUC_r represents the capacity of the buffer memory of the volatile memory of the r-th storage device (r is an integer from 1 to m), and $i_r$ represents a predetermined weight for the r-th storage device. $i_r$ may be a real number of 1 or more. That is, the capacity of the volatile memory of the PLP module 540 may be greater than or equal to the sum of values obtained by multiplying the capacity of the buffer memory of each of the volatile memories of the storage devices 530 by a predetermined weight.

Although FIG. 16 illustrates that the electronic device 500 includes one PLP module 540, the present disclosure is not limited thereto, and the electronic device 500 may include a plurality of PLP modules. In this case, each PLP module may perform a PLP operation on at least one storage device.

Figure 17:
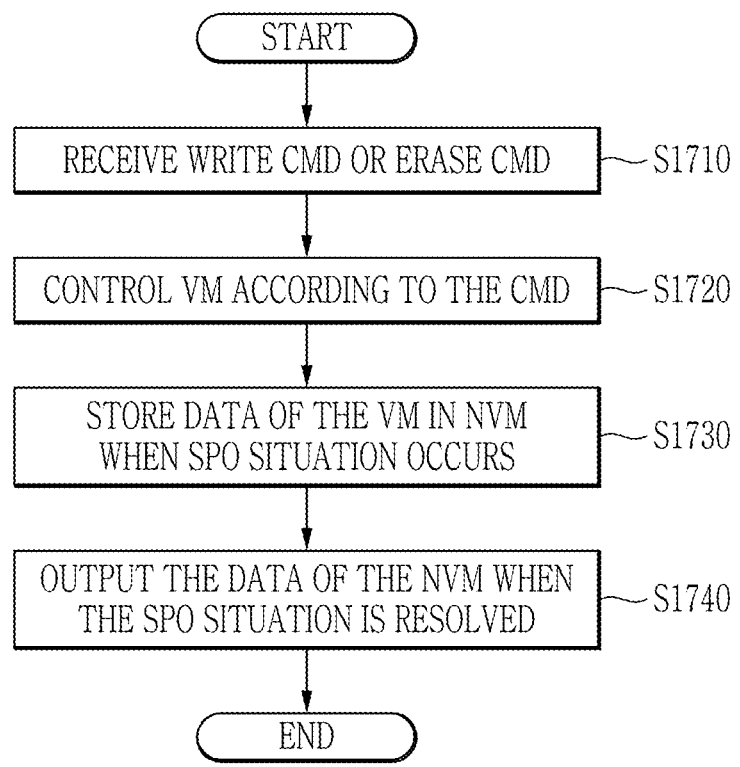
FIG. 17 illustrates a flowchart of a method for performing a PLP operation according to an embodiment.

FIG. 17 illustrates a flowchart of a method for performing a PLP operation according to an embodiment.

Referring to FIG. 17, a PLP operation according to an embodiment may be performed by the PLP module. Consistent with the discussion above, the PLP module is connected to the storage device through an interface, and when an SPO situation occurs in the storage device, the PLP module may prevent data of the storage device from being compromised by performing the PLP operation. The embodiment is not limited to the SPO situation, and may include a case in which the storage device may not be accessed due to a break situation or the like.

The PLP module may receive a write command or an erase command from the host (S1710). The PLP module and the host may be connected through an interface. When the command output by the host is a write command or an erase command, the interface may transmit the command to the storage device and the PLP module. When the command output by the host is a read command, the interface may transmit the command to the storage device.

The PLP module may control the volatile memory according to the write command or the erase command (S1720). For example, the PLP module may store data in the volatile memory according to the write command of the host. The PLP module may erase the data stored in the volatile memory according to the erase command of the host. In this case, since the storage device also receives the same command as the PLP module via the interface, the storage device may operate in the same manner as the PLP module. For example, the storage device may also store or erase data according to a command. That is, the storage device may store A data according to a write command of the host, and the PLP module may store A' data corresponding to the A data. The A data and the A' data may be the same or substantially the same. According to an erase command of the host, the storage device may erase B data, and the PLP module may erase B' data corresponding to the B data. The B data and the B' data may be the same or substantially the same.

The PLP module may receive a write command from the host in a state in which the volatile memory is full of data. In some embodiments, the PLP module may delete data from a storage area storing the oldest data in the volatile memory and write the data. In this case, the PLP module may store and manage the data to be deleted in the non-volatile memory. In other embodiments, the PLP module may overwrite data in a storage area storing the oldest data in the volatile memory.

The capacity of the volatile memory of the PLP module may be greater than the capacity of the buffer memory of the storage device. The storage device may include a plurality of buffer memories. The buffer memory may represent a storage unit when the storage device stores data from the volatile memory to the non-volatile memory. For example, the capacity of the volatile memory of the PLP module may be twice the capacity of the buffer memory of the storage device. Therefore, at a time point at which the PLP module is deleting old data and writing new data, or performing overwriting, the storage device might have stored data of the storage device corresponding to existing data of the PLP module in the buffer memory into a non-volatile memory.

In some embodiments, the PLP module may be connected to a plurality of storage devices through an interface. For example, the PLP module may be connected to a first storage device and a second storage device. The first storage device may store C data, and the second storage device may store D data. The PLP module may store C' data corresponding to the C data and D' data corresponding to the D data in the volatile memory. The C data and the C' data may be the same or substantially the same, and the D data and the D' data may be the same or substantially the same. In this case, the capacity of the volatile memory may be greater than the sum of the capacity of the buffer memory of the first storage device and the capacity of the buffer memory of the second storage device. For example, the capacity of the volatile memory of the PLP module may be twice the sum of the capacity of the buffer memory of the first storage device and the capacity of the buffer memory of the second storage device.

When an SPO situation occurs, it is possible to store data of the volatile memory in the non-volatile memory by using a voltage output by the capacitor module (S1730). When the SPO condition occurs, the storage device may be powered off. When the SPO situation occurs, the PLP module may operate by using the voltage output by the capacitor module.

In some embodiments, when the PLP module is connected to a plurality of storage devices, the PLP module may store data of a volatile memory corresponding to an inaccessible storage device to a non-volatile memory. For example, when the first storage device of the plurality of storage devices becomes inaccessible, the PLP module may store the A' data corresponding to the A data of the first storage device in the non-volatile memory.

When the SPO situation is resolved, it is possible to output data of the non-volatile memory (S1740). For example, when the SPO condition is resolved and the storage device becomes accessible, the PLP module may transmit data of the non-volatile memory to the storage device. The PLP module may access the storage device through an interface without passing through the host.

The storage device may transmit a request signal to the PLP module when the SPO situation is resolved and the power is turned back on. The request signal may include a request for data that the storage device has not completed processing in the SPO situation. The PLP module may transmit data of the non-volatile memory to the storage device in response to the request signal from the storage device.

In some embodiments, the storage device may request state information from the PLP module when the power is turned on. The state information is state information about the capacitor module of the PLP module, and may be used by the storage device to determine a storage unit. The PLP module may transmit the state information to the storage device in response to the request for the state information of the storage device.

Figure 18:
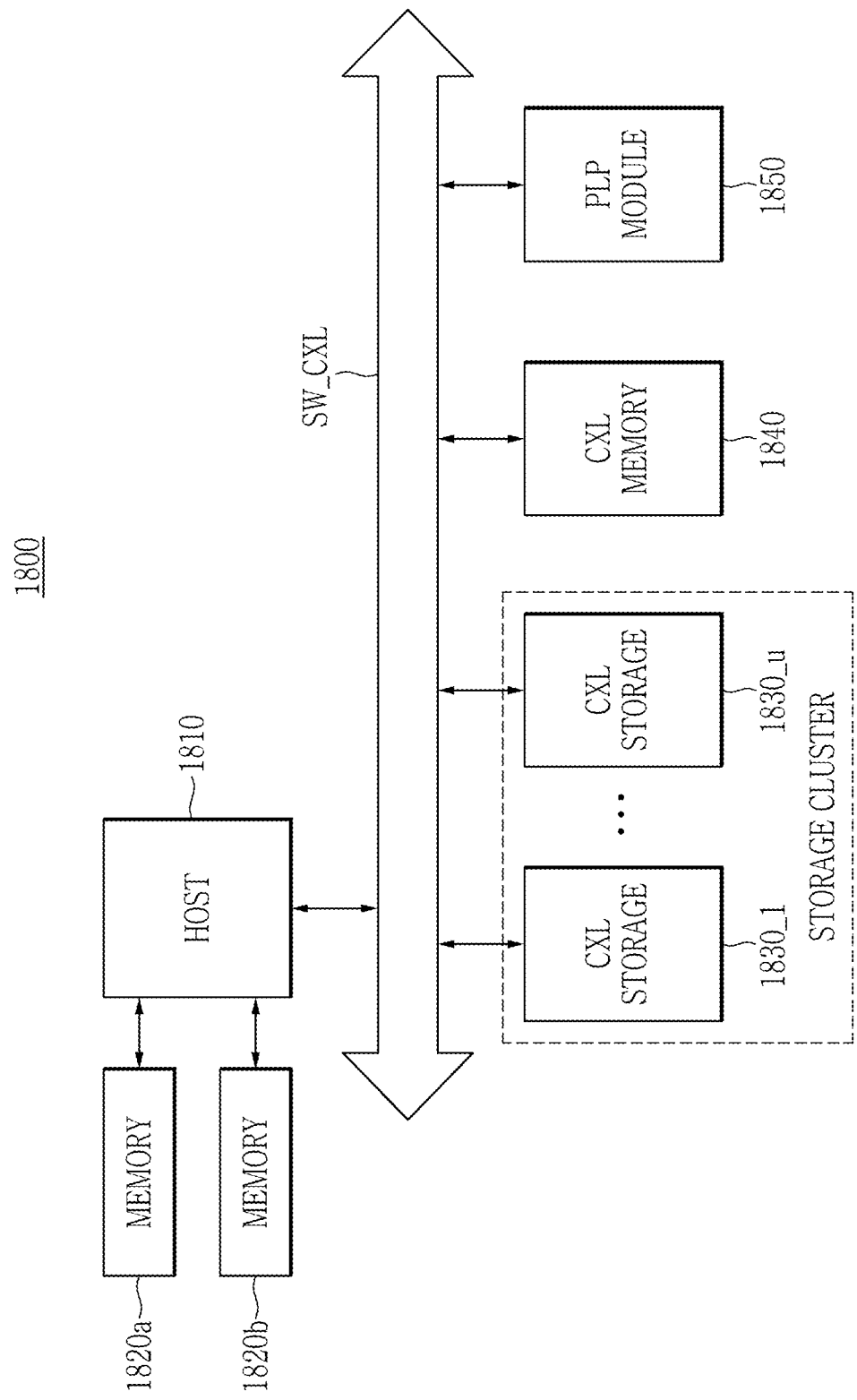
FIG. 18 illustrates a block diagram of a computer system according to an embodiment.

FIG. 18 illustrates a block diagram of a computer system 1800 according to an embodiment. In the following, detailed descriptions of overlapping constituent elements will be omitted for better understanding and ease of description.

Referring to FIG. 18, a computer system 1800 may include a host 1810, a plurality of memories 1820a and 1820b, a CXL switch SW_CXL, a plurality of CXL storages 1830_1 to 1830_u (u is an integer greater than 1), a CXL memory 1840, and a PLP module 1850.

The host 1810 may be directly connected to the plurality of memories 1820a and 1820b. The host 1810, the plurality of CXL storages 1830_1 to 1830_u, and the CXL memory 1840 may be connected to the CXL switch SW_CXL, and may respectively communicate with each other through the CXL switch SW_CXL.

In one embodiment, each of the plurality of CXL storages 1830_1 to 1830_u may be implemented as an individual storage device or storage module, and they may be connected to the CXL switch SW_CXL through different physical ports. That is, as the plurality of CXL storages 1830_1 to 1830_u are connected to the CXL switch SW_CXL, a storage area usable by the host 1810 is increased in capacity.

One of the plurality of CXL storages 1830_1 to 1830_u (for example, the first CXL storage 1830_1) may be a device that cannot perform a PLP operation by itself in an SPO situation. The first CXL storage 1830_1 may be powered off in the SPO situation. The first CXL storage 1830_1 may receive recovery data from the PLP module 1850 when the power is turned on.

The CXL switch SW_CXL may transmit a command of the host 1810 to the first CXL storage 1830_1 and the PLP module 1850. For example, the CXL switch SW_CXL may transmit a write command or an erase command of the host 1810 to the first CXL storage 1830_1 and the PLP module 1850. Accordingly, the first CXL storage 1830_1 and the PLP module 1850 may perform similar operations. The CXL switch SW_CXL may provide an interface for allowing the first CXL storage 1830_1 and the PLP module 1850 to communicate with each other. Accordingly, the first CXL storage 1830_1 may transmit a request signal to the PLP module 1850 through the CXL switch SW_CXL, and the PLP module 1850 may transmit a response signal to the first CXL storage 1830_1 through the CXL switch SW_CXL. For example, the response signal may include state information, recovery data, and the like.

In the embodiment, at least a partial area of the CXL memory 1840 may be allocated as a dedicated area for the plurality of CXL storages 1830_1 to 1830_u. For example, the host 1810 may manage the plurality of CXL storages 1830_1 to 1830_u as one storage cluster, and may allocate a partial area of the CXL memory 1840 as a dedicated area for one storage cluster. Alternatively, the host 1810 may allocate each of partial areas of the CXL memory 1840 as a dedicated area for each of the plurality of CXL storages

1830_1 to 1830_u. In some embodiments, a plurality of CXL memories 1840 may be provided.

The description of the PLP module described with reference to FIG. 1 to FIG. 17 may be equally applied to the PLP module 1850. When a the first CXL storage 1830_1 becomes inaccessible (for example, an SPO situation or a break situation), the PLP module 1850 may store data of the volatile memory in the non-volatile memory. The PLP module 1850 may transmit data stored in the non-volatile memory to the first CXL storage 1830_1 when the first CXL storage 1830_1 becomes accessible. For example, when the first CXL storage 1830_1 resumes operating in a normal state, it transmits a request signal to the PLP module 1850, and the PLP module 1850 may transmit data to the first CXL storage 1830_1 in response to the request signal. In some embodiments, the PLP module 1850 may perform PLP operations on the plurality of CXL storages.

Figure 19:
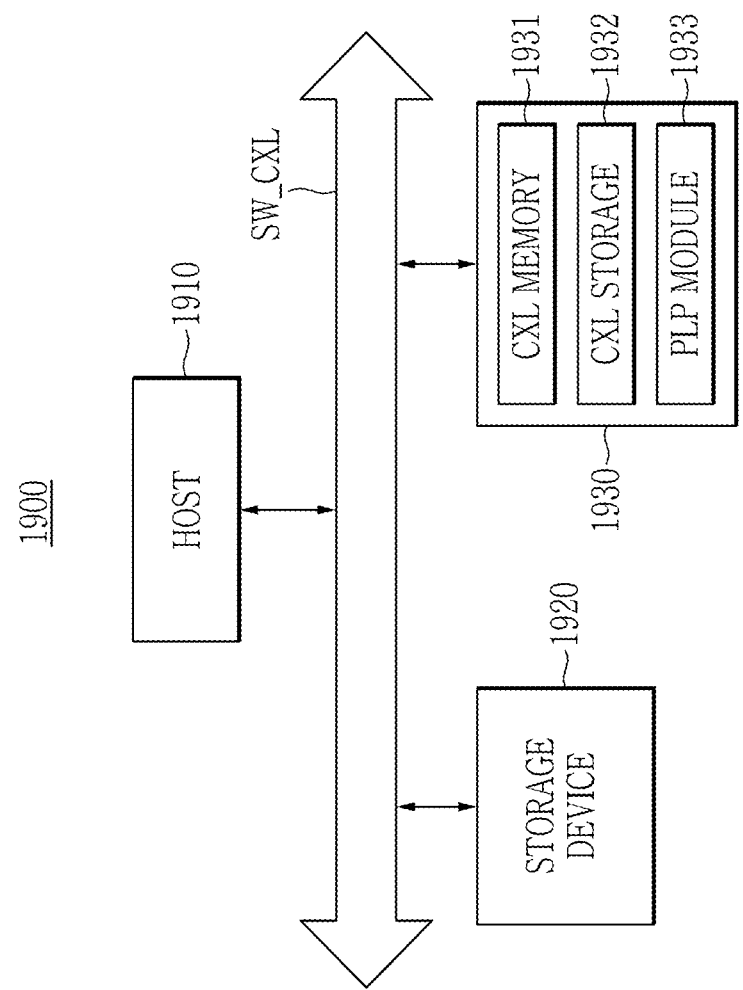
FIG. 19 illustrates a block diagram of a computer system according to an embodiment.

FIG. 19 illustrates a block diagram of a computer system 1900 according to an embodiment. In the following, detailed descriptions of overlapping constituent elements will be omitted for better understanding and ease of description.

Referring to FIG. 19, a computer system 1900 may include a host 1910, a storage device 1920, and a system-on-chip (SoC) 1930.

The host 1910, the storage device 1920, and the system-on-chip 1930 may be connected to a CXL switch SW_CXL, and may communicate with each other through the CXL switch SW_CXL.

The CXL switch SW_CXL may transmit a command of the host 1910 to the storage device 1920 and the system-on-chip 1930. For example, the CXL switch SW_CXL may transmit a write command or an erase command of the host 1910 to the storage device 1920 and the system-on-chip 1930. Accordingly, the storage device 1920 and the system-on-chip 1930 may perform similar operations. The CXL switch SW_CXL may provide an interface for allowing the storage device 1920 and the system-on-chip 1930 to communicate with each other. Accordingly, the storage device 1920 may transmit a request signal to the system-on-chip 1930 through the CXL switch SW_CXL, and the system-on-chip 1930 may transmit a response signal to the storage device 1920 through the CXL switch SW_CXL. For example, the response signal may include state information, recovery data, and the like.

The storage device 1920 may be a device that cannot perform a PLP operation by itself in an SPO situation. For example, the storage device 1920 may not include an energy storage device such as a capacitor module or auxiliary power supply. Thus, the storage device 1920 may be powered off immediately when the SPO situation occurs. The storage device 1920 may receive recovery data from the system-on-chip 1930 when power is turned on.

The system-on-chip 1930 may include a CXL memory 1931, a CXL storage 1932, and a PLP module 1933. The CXL memory 1931 may be used as an alternative to a general memory. For example, the speed of the host 1910 may be improved by using the CXL memory 1931 instead of the general memory. The CXL storage 1932 may increase a storage area available to the host 1910. That is, the host 1910 is connected to the storage device 1920 and the CXL storage 1932 through the CXL switch SW_CXL, so that the available storage area of the host 1910 may be increased in capacity.

The description of the PLP module described with reference to FIG. 1 to FIG. 17 may be equally applied to the PLP module 1933. When the storage device 1920 becomes inaccessible (for example, an SPO situation or a break situation), the PLP module 1933 may store data of the volatile memory in the non-volatile memory. When the storage device 1920 resumes being accessible, the PLP module 1933 may transmit data stored in the non-volatile memory to the storage device 1920. For example, when the storage device 1920 is in a normal state, the storage device 1920 may transmit a request signal to the PLP module 1933, and the PLP module 1933 may transmit data to the storage device 1920 in response to the request signal. In some embodiments, the PLP module 1933 may perform PLP operations on a plurality of storage devices.

In the embodiment, the PLP module 1933 may perform the PLP operation by using the CXL memory 1931. For example, the storage device 1920 and the system-on-chip 1930 may write or erase data according to a write command or an erase command of the host 1910. In this case, when an SPO situation or a break situation occurs, the storage device 1920 is powered off, and the system-on-chip 1930 continues to operate by using the power of the PLP module 1933. Thereafter, when the storage device 1920 is powered on, the storage device 1920 may transmit a request signal to the system-on-chip 1930. The system-on-chip 1930 may transmit data of the CXL memory 1931 to the storage device 1920 in response to the request signal. As described above, the PLP module 1933 may reduce overhead by storing and managing data in the CXL memory 1931 without using internal non-volatile memory.

In some embodiments, each constituent element or a combination of two or more constituent elements described with reference to FIG. 1 to FIG. 19 may be implemented as a digital circuit, a programmable or non-programmable logic device or array, an application specific integrated circuit (ASIC), or the like.

While embodiments of the present disclosure have been described in connection with what are presently considered to be exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A power loss protection (PLP) module configured to be connected to an interface that is connected to a first storage device and to perform a PLP operation for the first storage device, wherein the first storage device is configured without an energy storage device for supplying voltage for use in the PLP operation, the PLP module comprising:
   a volatile memory configured to store data according to a command of a host;
   a non-volatile memory configured to receive and store data of the volatile memory when the first storage device becomes inaccessible;
   a capacitor module configured to supply a voltage to the volatile memory and the non-volatile memory when the first storage device becomes inaccessible; and
   a controller configured to control operations of the volatile memory, the non-volatile memory, and the capacitor module,
   wherein the volatile memory is configured to store second data corresponding to first data of the first storage device, and
   wherein the controller is configured to store the second data in the non-volatile memory when the first storage device becomes inaccessible.

2. The PLP module of claim 1, wherein
the first storage device becoming inaccessible occurs due to a sudden power off (SPO) situation or a break situation.

3. The PLP module of claim 1, wherein
the interface is configured to transmit a read command of the host to the first storage device without transmitting the read command to the PLP module, and is configured to transmit a first write command from the host to the first storage device and to the PLP module.

4. The PLP module of claim 1, wherein
the controller is configured to transmit the second data of the non-volatile memory to the first storage device in response to a signal from the interface connected to the PLP module.

5. The PLP module of claim 4, wherein
the controller is configured to transmit the second data of the non-volatile memory to the first storage device when the first storage device resumes being accessible.

6. The PLP module of claim 5, wherein
the controller is configured to transmit the second data of the non-volatile memory to the first storage device in response to a request signal of the first storage device when the first storage device resumes being accessible.

7. The PLP module of claim 1, wherein
the controller is configured to transmit state information of the capacitor module to the first storage device, and
the first storage device is configured to determine a storage unit based on the state information.

8. The PLP module of claim 7, wherein
the controller is configured to transmit the state information to the first storage device in response to a request signal of the first storage device.

9. The PLP module of claim 1, wherein
a capacity of the volatile memory is larger than a capacity of a buffer memory of the first storage device.

10. The PLP module of claim 9, wherein
the capacity of the volatile memory is twice the capacity of a buffer memory of the first storage device.

11. The PLP module of claim 1, wherein
the PLP module is configured to be connected to a second storage device,
the volatile memory is configured to store fourth data corresponding to third data of the second storage device, and
the controller is configured to store the fourth data in the non-volatile memory when the second storage device becomes inaccessible.

12. The PLP module of claim 11, wherein
a capacity of the volatile memory is larger than a sum of a capacity of a buffer memory of the first storage device and a capacity of a buffer memory of the second storage device.

13. The PLP module of claim 12, wherein
the capacity of the volatile memory is twice the sum of the capacity of the buffer memory of the first storage device and the capacity of the buffer memory of the second storage device.

14. The PLP module of claim 1, wherein
the controller is configured to, in response to a write command including write data received from the host in a state in which the volatile memory is full of data, delete data in a storage area containing the oldest stored data in the volatile memory and to record the write data in the storage area.

15. The PLP module of claim 1, wherein
the controller is configured to, when a write command is received from the host in a state in which the volatile memory is full of data, overwrite data in a storage area storing the oldest data in the volatile memory.

16. The PLP module of claim 1, wherein the PLP module is configured to transmit state information of the capacitor module in response to a request signal from the first storage device.

17. An electronic device comprising:
a host configured to control an operation of the electronic device;
a storage device configured to provide a data access operation according to a first command received from the host;
a power loss protection (PLP) module configured to perform a PLP operation when an error is detected in the storage device; and
an interface that connects the host, the storage device, and the PLP module, the interface being connected to the storage device via a first connection at the interface and being connected to the PLP module via a second connection at the interface that is distinct from the first connection, the interface being configured to transmit the first command to the storage device via the first connection without use of the second connection when the first command is a read command, and configured to transmit the first command to the storage device via the first connection without use of the second connection and to the PLP module via the second connection without use of the first connection when the first command is a write command or an erase command.

18. The electronic device of claim 17, wherein the PLP module includes:
a volatile memory configured to store first data according to the first command of the host when the first command is a write command;
a non-volatile memory configured to store the first data of the volatile memory when an error is detected in the storage device; and
a controller configured to control the non-volatile memory to output the first data to the storage device when the storage device resumes normal operation after the error is detected in the storage device.

19. The electronic device of claim 17, wherein the interface is configured to transmit the first command only to the storage device via the first connection and without use of the second connection and not to the PLP module when the first command is a read command.

20. A method for performing a power loss protection (PLP) operation for a storage device by a PLP module that is connected to an interface that is connected to the storage device, the method comprising:
receiving a write command or an erase command from a host;
controlling a volatile memory according to the write command or the erase command;
storing data of the volatile memory in a non-volatile memory by using a voltage output by a capacitor module when a sudden power off (SPO) situation occurs; and
outputting data of the non-volatile memory to the storage device when the SPO situation is resolved,
wherein controlling the volatile memory according to the write command or the erase command comprises storing second data corresponding to first data of the storage device, and wherein storing data of the volatile memory in the non-volatile memory comprises storing the second data in the non-volatile memory when the storage device becomes inaccessible, and wherein outputting data of the non-volatile memory to the storage device comprises transmitting the second data to the storage device when the storage device resumes being accessible.

\* \* \* \* \*